May 22, 1923.  1,456,212
J. A. BISHOP
ART OF POWER GENERATION
Filed Sept. 29, 1921  2 Sheets-Sheet 1
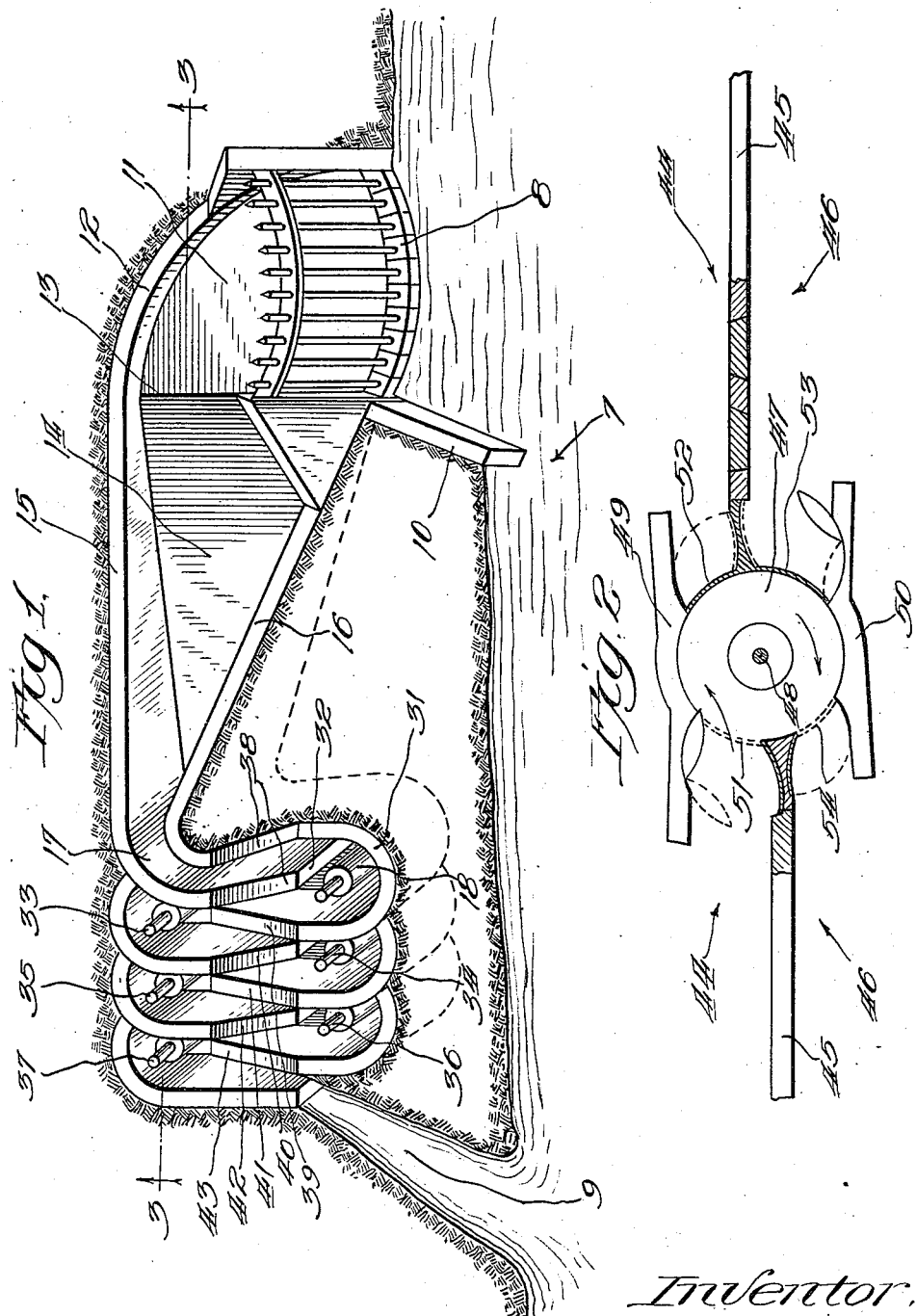

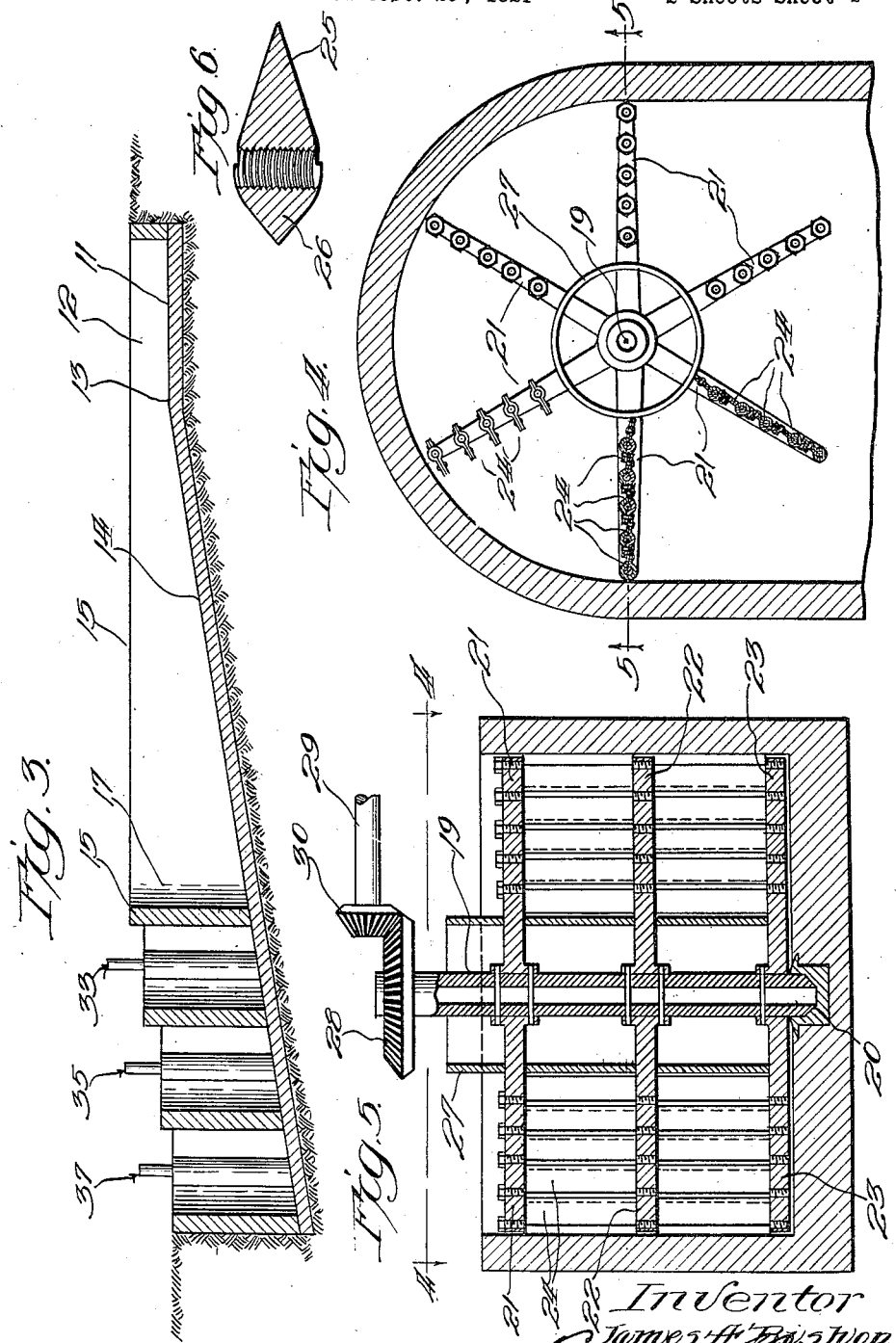

Patented May 22, 1923.

1,456,212

UNITED STATES PATENT OFFICE.

JAMES A. BISHOP, OF DENVER, COLORADO.

ART OF POWER GENERATION.

Application filed September 29, 1921. Serial No. 504,163.

*To all whom it may concern:*

Be it known that I, JAMES A. BISHOP, a citizen of the United States, residing at Denver, in the county of Denver and State of Colorado, have invented certain new and useful Improvements in the Art of Power Generation, of which the following is a specification.

This invention has to do with certain improvements in the art of power generation, having reference more particularly to the art of generating power from water flow. It has reference more especially to the development of power from the water of flowing streams and the like, as well as from the flow of water occasioned by the tides, and so forth.

One of the objects of the invention is to provide an arrangement whereby advantage may be taken of the flow of relatively large quantities of water under low head.

Another object of the invention is to provide an arrangement by means of which the down stream flow of water may be used for the generation of power without the necessity of constructing dams or barriers entirely across the stream.

Still another object of the invention is to provide an arrangement by means of which the total drop of the flow may be more readily availed of by a cascade or series arrangement in which the water may be passed in succession through a number of power generating units in those cases in which a single one of the units could not satisfactorily and efficiently handle the entire difference in water potential.

Another object of the invention is to provide an arrangement whereby the power of the tides may be availed of for generation of power on the flood flow as well as the ebb flow, thus making it possible to operate the water wheels almost constantly instead of only one-half of the time as heretofore.

Another object of the invention is to provide an improved form and construction of the water wheel itself, and in this connection particularly to provide a water wheel which will operate efficiently on relatively low heads.

Other objects and uses will appear from a detailed description of the invention which consists in the features of construction and combinations of parts hereinafter described and claimed.

In the drawings:

Figure 1 shows a perspective view of an installation embodying the features of the present invention, showing how the water may be drawn from the stream at one point and returned to the stream at a lower point after passing through the power generating apparatus;

Fig. 2 shows a plan view partly in section of an installation for making use of the power of the tides, the gates being set for operation on the flood flow;

Fig. 3 shows a longitudinal section through the arrangement shown in Fig. 1, being taken substantially on the line 3—3 looking in the direction of the arrows;

Fig. 4 shows a plan view partly in section illustrating the wheel construction, being taken on the line 4—4 of Fig. 5 looking in the direction of the arrows;

Fig. 5 shows a vertical section taken on the line 5—5 of Fig. 4 looking in the direction of the arrows; and Fig. 6 shows on enlarged scale a vertical section through one of the spokes of the wheel of Figs. 4 and 5.

Referring first to Figs. 1 and 3, I have therein illustrated an installation in which water is drawn from the stream 7 through the gates 8 and is afterwards returned to the stream at the down stream point 9 after giving up its energy. The difference in elevation of the stream between the points 8 and 9 is a measure of the energy which may be given up by each pound of water flowing through the installation.

The arrangement of the present invention is intended particularly for use in those cases in which the stream is relatively shallow but carries a substantial volume of water. The volume of water which may be drawn from the side of such a stream will depend upon the width of the gates multiplied by the depth of the water flowing into the gates, being substantially limited by the depth of the stream. I therefore illustrate the gates 8 as being of considerable width. At the down stream side of said gate I have illustrated a barrier wall 10 which projects out into the stream only a sufficient distance to assist in diverting the water through the gate, and does not interfere with the stream beyond such extent.

Leading from the gate 8 and barrier wall 10 is a canal having the substantially level floor 11 and the outer curved wall 12. The floor 11 is located substantially at the level of the bottom of the stream, so that the water flowing through the gate will flow directly onto this floor; and the wall 12 is of sufficient height to hold the water on the floor 11 of the same depth as the water in the stream. The top of the wall 12 should therefore be at or above the level of the water in the stream. The wall 12 curves around into the down stream direction. The canal cross section thus established diminishes in the direction of flow, so that the velocity of the water increases.

At the point 13 the floor 11 commences to descend along the incline 14, so that the water will run down said incline. Simultaneously the side walls 15 and 16 of the canal draw together, as clearly illustrated in Figure 1; and the rate at which these side walls draw together is such, as compared with the incline 14 of the floor, that the cross sectional area of the canal along the inclined portion decreases for the purpose above explained. This being the case, the water will flow with an increasing velocity and momentum, since its volume remains unchanged.

The lower end of the inclined portion 14 of the floor should not be at a lower elevation than the bottom of the stream at the point where the water is to be returned into the stream. At or adjacent to the lower end 17 of the canal is located a water wheel designated in its entirety by the numeral 18. This water wheel is illustrated in detail in Figs. 4, 5 and 6. It has a vertical shaft 19 working in an upper bearing and having a step bearing 20 at its lower end in the floor of the canal. A series of radial arms 21, 22 and 23 on the vertical shaft 19 carry the vertical vanes 24, said vanes being pivoted so that they can rock about vertical axes. Each arm is of the stream line form illustrated in Fig. 6. Each vane has a long wing 25 on one side and a short wing 26 on the other side. The different wings are so related to each other that when they stand substantially parallel to the arms of the wheel, as is the case with some of the wings shown in Fig. 4, they will overlap each other and prevent the direct flow of water past them. They are held in this position by the water pressure exerted on their longer wings 25. Whenever the water pressure is reversed and is exerted on their back faces the wings will rotate into the transverse position shown on one of the arms of the wheel of Fig. 4, so that water may flow freely between them.

The central portion of the wheel is cut off by means of a cylindrical tube 27, since the water acting inside of the radius of this wall would be acting on such a short radius as to be largely ineffective. The upper end of the shaft 19 carries a bevel gear 28 by means of which power may be delivered to the shaft 29 through the pinion 30.

The wheel 18 is located within a curved chamber established by the semi-circular wall 31 of Fig. 1, this semi-circular wall being a continuation of the canal wall 16. The other canal wall 15 terminates in the vertical partition 32 at the same radius from the shaft of the wheel as the wall 31. Consequently the wheel rotating in the chamber established by the wall 31 will barely reach to the end 32 of the wall 15. The water entering the wheel from the canal is thus compelled to work against one side of the wheel, thus driving it, and the spent water is delivered from the wheel at the other side of the partition 32.

The depth of the wheel and of the blades 24 is sufficient to effectively prevent the flow of water past the wheel along the floor of the canal. The water delivered from the wheel may be returned immediately to the canal, or it may be then passed through other wheels of similar form and construction.

In Fig. 1 I have illustrated five other wheels besides the wheel 18, the same being successively numbered as 33, 34, 35, 36, and 37. When a multiplicity of wheels is used the floor of the canal should descend from wheel to wheel so as to enable each wheel to abstract its pro-rata portion of the energy of the water. In this connection it will be noted that the wheels 33, 34, 35, 36, and 37 are shown in Fig. 1 as being located at successively lower levels.

In those cases in which it is desired to establish a still larger head on each wheel this may be done by contracting the canal immediately in advance of a wheel and correspondingly deepening it, or else by providing a sudden drop immediately in advance of each wheel. This arrangement is shown in Fig. 1 in which the walls 15 and 16 are sloped downwardly as shown at 38 immediately in advance of the wheel 18, other similar slopes being provided at 39, 40, 41, 42, and 43 in Fig. 1.

It will be observed that by the principle of contracting the width of the canal simultaneously with the increase of its depth it becomes possible to use large volumes of water from the shallow streams efficiently on wheels having vertical axes and vertical blades.

In Fig. 2 I have illustrated a convenient application of this type of wheel to a tide flow project. The ocean is located at the side 44 of the barrier wall 45, a pond or lake being located at the side 46 of said barrier wall. Within the barrier wall is located a wheel chamber 47, the wheel having the vertical shaft 48 substantially in line with the barrier wall. A guard wall 49 is located on the ocean side of the wheel, and a guard wall 50 on the pond side thereof. A flood entrance gate 51 and an ebb discharge gate 52 are located at opposite sides of the wheel chamber on the ocean side thereof, and an ebb entrance gate 53 and a flood discharge gate 54 are located at opposite sides of the pond side of the wheel chamber. When the gates 51 and 54 are opened, as illustrated in Fig. 2, the waters from the flood tide will enter through the gate 51, as shown by the arrow, driving the wheel in the clockwise direction and being discharged into the pond through the gate 54. When the tide reverses, the gates 51 and 54 will be closed and the gates 52 and 53 will be opened so as to allow the water to flow back from the pond into the ocean, but the wheel will be driven in the same direction of rotation as previously. The arrangement is therefore such that a practically continuous uni-directional rotation of the wheel is established.

While I have herein shown and described only certain embodiments of the features of my invention, still I do not limit myself to the same except as I may do so in the claims.

I claim:

1. An installation for the generation of power from a stream of water flowing down grade, including a relatively broad and shallow intake canal in communication with said stream, a transfer canal in communication with said intake canal and having a downwardly inclined floor and converging side walls so proportioned that the cross sectional area of water in said transfer canal on vertical transverse planes decreases throughout the length of said transfer canal in the direction of flow, whereby the rate of water flow through the transfer canal increases, a delivery canal in communication with the transfer canal, a vertical wheel chamber in communication with the delivery canal, a water wheel within said wheel chamber, mounted for rotation on a vertical axis, and means for delivering water from said wheel back to the flowing stream at a down grade point with respect to the intake, substantially as described.

2. An installation for the generation of power from a stream of water flowing down grade, including a relatively broad and shallow intake canal in communication with said stream, a transfer canal in communication with said intake canal and having a downwardly inclined floor and converging side walls so proportioned that the cross sectional area of water in said transfer canal on vertical transverse planes decreases throughout the length of said transfer canal in the direction of flow, whereby the rate of water flow through the transfer canal increases, a vertical wheel within said wheel chamber mounted for rotation on a vertical axis, and means for delivering water from said wheel back to the flowing stream at a down grade point with respect to the intake, substantially as described.

3. An installation for the generation of power from a stream of water flowing down grade, including a relatively broad and shallow intake canal in communication with said stream, a transfer canal in communication with said intake canal and having a downwardly inclined floor and converging side walls so proportioned that the cross sectional area of water in said transfer canal on vertical transverse planes decreases throughout the length of said transfer canal in the direction of flow, whereby the rate of water flow through the transfer canal increases, a vertical wheel chamber in communication with the transfer canal, a water wheel within said wheel chamber mounted for rotation on a vertical axis, and means for delivering water from the wheel chamber to the stream at a down grade point, substantially as described.

JAMES A. BISHOP.